Feb. 3, 1970  J. G. MILNER  3,493,120
CENTRIFUGAL SEPARATOR
Filed Jan. 29, 1968

INVENTOR
JAMES G. MILNER
BY
Albert A. Mahansel
ATTORNEY

United States Patent Office 3,493,120
Patented Feb. 3, 1970

3,493,120
CENTRIFUGAL SEPARATOR
James G. Milner, 60 Fales St.,
Worcester, Mass. 01606
Filed Jan. 29, 1968, Ser. No. 701,409
Int. Cl. B01d 21/26
U.S. Cl. 210—512        5 Claims

ABSTRACT OF THE DISCLOSURE

A device for separating by centrifugal force suspended solids from liquid-solid solutions, such as, for example, suspended abrasives and metal particles from the coolant liquid used in grinding operations. In particular, the invention provides features which permit controllable variations over extremely wide ranges of the solids content in the sludge being discharged from the separator while at the same time producing a clarified effluent practically free of suspended solids.

BACKGROUND OF THE INVENTION

Many types of centrifugal apparatus have been used for separating suspended solids from liquids. One well known type comprises a cylindrical container having an upper cylindrical and a lower conical portion. The contaminated liquid or slurry is tangentially introduced into the cylindrical portion under pressure to produce a vortex within the container. Rotation of the slurry produces centrifugal separating forces which cause the heavier particles therein to move outwardly and downwardly to discharge through the bottom of the conical portion. The purified liquid is withdrawn through the top central portion of the container.

It is frequently desirable to vary the concentration of solids being withdrawn from the separator for any one of a number of reasons. For example, where the surface finish in grinding operations is particularly critical, it is important that the coolant be free of scratch-producing contaminants, whether these be metallic or non-metallic. It is with this concept that this invention is particularly concerned.

SUMMARY OF THE INVENTION

This invention particularly pertains to a mechanism permitting a variation in the concentration of solids withdrawn from centrifugal type separators. Applicant has discovered that the concentration may be controlled through a critical positioning of the inner end of the outlet tube for clean effluent discharge with respect to the solids discharge point at the apex of the conical portion of the container. It has been determined that the closer the inner end is positioned to the discharge, the less concentrated will be the discharge of the sludge and vice versa.

Additionally, applicant has found that the configuration of the inner end of that outlet tube and also its relative rotational position with respect to the slurry inlet into the separator have an even greater influence upon the wetness of the sludge being withdrawn therefrom and upon the cleanliness of the clarified effluent both as to particle size and concentration of solids. A proper selection of the combination of these factors actually makes it possible to withdraw sludge from such a separator having a solids content of higher than ninety five percent, which has been previously unheard of in centrifugal separators.

Clarified effluent can be produced having suspended solids therein no larger in size than five to ten microns in a single pass through the separator, and on repeated cycles the particle size can be kept to under five microns and over ninety percent of the total suspended solids can be removed.

BRIEF DESCRIPTION OF THE DRAWINGS

The invention will be described in greater detail with reference to specific embodiments thereof as shown in the accompanying figures of drawing, wherein.

DESCRIPTION OF THE PREFERRED EMBODIMENT

Figure 1:
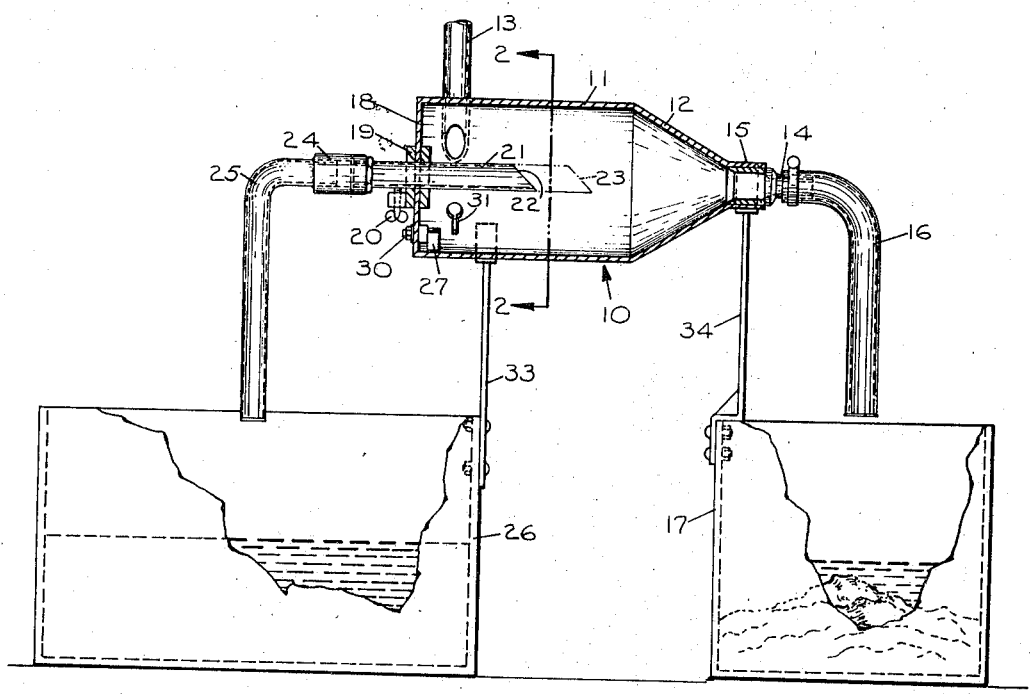
FIG. 1 is an elevation view, partly in section, showing the centrifugal separator in its preferred mounting position with respect to a pair of tanks for receiving the discharge therefrom.

In FIG. 1 a centrifugal separator is generally indicated by the arrow 10 and comprises a container having a cylindrical portion 11 and an adjacent conical portion 12, the axis of the container being preferably disposed on a horizontal plane. An inlet 13 is disposed adjacent to the outer end of the cylindrical portion to permit tangential feeding of the liquid material to be purified. The inner end of the inlet terminates along the periphery of the cylindrical portion for optimum results as noted in FIG. 2.

An exhaust or discharge port 14 is threadedly mounted at the apex 15 of the conical portion and may be of variable inner diameter depending upon the physical characteristics of the solids to be discharged therefrom. A larger internal diameter will be required to coarser materials and a correspondingly smaller inner diameter for finer solids. A flexible tube 16 is connected to the discharge port 14 and discharges into any suitable container 17.

The outer end of the cylindrical portion is closed by a cover 18. Axially mounted in the cover by means of a suitable fitting 19 having a quick release clamp 20 is a clarified effluent discharge tube 21 having an inner end 22 preferably disposed at an acute angle to the axis of the container. It has been found that the degree of slope of this opening from the vertical as well as its rotational position with respect to the inlet tube 13 have a very decided effect upon the solids concentration in the sludge withdrawn from the container and also upon the discharge rate and degree of purification of clarified effluent due to a shearing effect imparted to the circulating liquid and variation in the turbulence and liquid movement in the effluent being discharged, all as will be further explained in more detail hereinafter.

Applicant has also found that the positioning of the tube end in the direction of the dotted line position such as at 23 closer to the solid discharge point at the apex 15 of the conical portion of the container results in the unusual effect of a discharge through the tube 16 which is less concentrated in solids while moving the tube end to the left hand side of the container as viewed in FIG. 1 increases the solids concentration of the sludge discharge. This variation in the positioning of the tube end in combination with the angular opening and its relative position as mentioned above thus makes possible further selective variation in solids concentration over wide ranges. A sleeve is provided at 24 at which point the tube 21 is divided into a second section 25 discharging into a clarified effluent container 26. The tube 21 should be unobstructed and free of any valves to permit a maximum discharge rate of clarified effluent therefrom in a spiralling action. The sleeve 24 is constructed so as to permit relative rotational movement between tube sections 21 and 25.

A further means of controlling the solids concentration in the waste discharged into the container 17 comprises a baffle 27 mounted pivotally in the cover 18 and movable between the solid line position shown at 28 and dotted line position shown at 29. Position 28 corresponds to the flow path of circulating fluid. The closer the baffle is moved toward the adjacent wall of the container 11 by means of an adjustment at 30, the more dilute will be the discharge of waste liquid at 15. This baffle is also effective in purging the system and in controlling the velocity of the circulating liquid.

A further baffle 31 when moved from its solid line to dotted line position 32 is effective to deflect fluid from the inlet and into an axial direction toward the sold discharge 15 to purge the system if it should become clogged with solids or for quick manual control of the liquid content of the waste discharge. In use this baffle does not impair the efficiency of the unit.

Suitable support means 33 and 34 suspend the separator above the containers 17 and 26.

In operation, a slurry or any waste liquid containing suspended solids is introduced into the tube 13 by means of a pump (not shown) at a sufficiently high rate to provide a vortex in the separator 10 whereby the liquid will be caused to spin around the inner periphery thereof. Waste solution concentrated in solids will be caused to discharge through centrifugal action through the tube 16 and clarified effluent through tube 25.

The use of a tube 21 having a square inner end and positioning that end axially of the container will produce decided effects in the wetness or solids concentration of the sludge discharge from port 14. A pressure differential will exist across the ends of the separator, the degree of which will be dependent in part upon the diameter of port 14. Where a relatively large port size is used, a vacuum will exist at that end of the separator and air will be sucked into the separator and increase foaming of the clarified effluent. In certain applications, such foaming is desirable, as, for example, where copper fines, aluminum dust or a very light solid material is involved, in which case the foam can be skimmed off the top of the clarified effluent container and the solids easily separated therefrom.

Figures 2, 3:
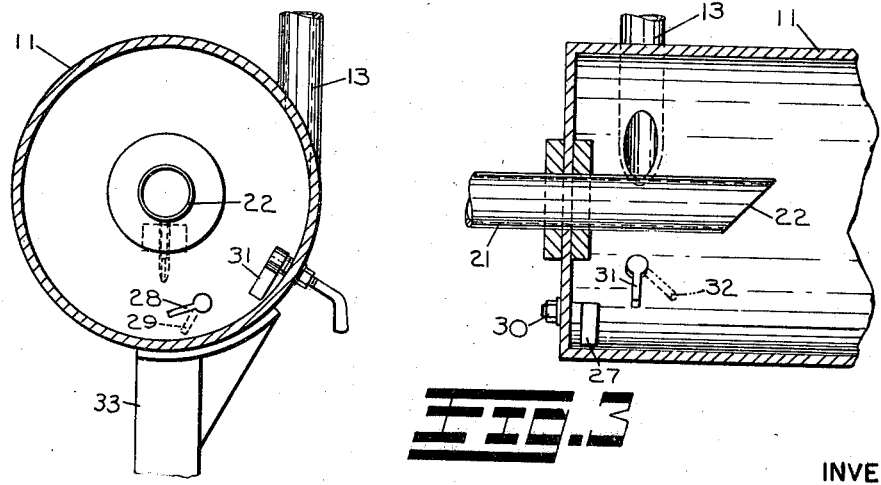
FIG. 2 is a sectional view of the separator on an enlarged scale taken on line 2—2 of FIG. 1 and looking in the direction of the arrows.
FIG. 3 is a partial sectional view similar to FIG. 1 and showing the clarified effluent tube in a different position from that of FIG. 1.

Applicant has discovered that a much greater degree of control can be achieved in the solids concentration of the sludge, in the discharge rate of clarified effluent and purification thereof, and in foaming of the effluent where the axial adjustment is combined with a proper selection of the angular opening at the inner end of tube 21 as well as its relative rotational position with respect to the liquid inlet 13. The steeper the angular opening is inclined from the vertical, the greater will be the rate of discharge of clarified effluent and the greater will be the rotational speed of liquid in the container, apparently due in part to decreased resistance in transferring the liquid into the discharge tube 21. Also, the angular tube end permits a broader variation in the diameter of port 14 as the vacuum otherwise present at the port can be eliminated where the tube is rotationally positioned as shown in FIG. 3. In this case the opening is rotated ninety degrees from the inlet opening of tube 13 into the separator in the direction of rotation of the liquid. In this position no vacuum will exist at port 14, no air will be forced into the container, and thus foaming will be minimized. Also, in this position the sludge will have its maximum degree of concentration and nearly solid sludge can be produced.

Where the opening 22 is positioned as shown in FIG. 1 or at two hundred seventy degrees from the inlet opening of tube 13 in the direction of rotation of liquid, a maximum vacuum condition will exist at the port 14 with resultant maximum foaming action upon the clarified effluent. This position will also produce a maximum wetness of sludge leaving port 14, or a sludge of low solids concentration. This vacuum can be further utilized to introduce a non-flammable or temperature controlling refrigerant, such as carbon dioxide which would be desirable in processing of solids and oils having low flash points. The refrigerant would be dispersed throughout the effluent and would lower the temperature and flash point. The effluent could then be discharged into a closed container to minimize fire hazard.

Obviously, through a proper selection of the variables indicated, and in particular through the provision of an angular inner end of tube 21, rotational position of that opening, and its axial position within the cylindrical portion of the separator, a wide selection in the characteristics of the clarified effluent and sludge can be achieved as desired.

I claim:
1. A centrifugal separator for clarifying liquid solutions containing solids suspended therein which comprises:
   (a) a container having a cylindrical portion and an adjacent conical portion, said container being free of any internal rotatable vanes,
   (b) an inlet disposed adjacent the outer end of the cylindrical portion and adapted to permit tangential feeding of said solutions,
   (c) an open discharge for continuous concentrated waste disposal adjacent the apex of said conical portion, and
   (d) a discharge tube for clarified effluent axially mounted in the cylindrical portion of said separator and having an inner end, and means for axially positioning said inner end thereby to vary the solids content in the concentrated waste being continuously discharged therefrom.

2. A centrifugal separator according to claim 1 wherein said inner end of said discharge tube has an opening inclined at an acute angle to the axis of the separator.

3. A centrifugal separator according to claim 1 wherein a cover is provided at the outer end of said cylindrical portion, a baffle, and means for mounting said baffle on said cover and for permitting angular positioning of said baffle thereby to affect the liquid flow in the container.

4. A centrifugal separator according to claim 1 wherein said container is mounted on a horizontal axis.

5. A centrifugal separator according to claim 2 wherein means is provided for rotatably positioning said inclined opening with respect to said inlet, thereby to vary the characteristics of said clarified effluent and said sludge.

References Cited

UNITED STATES PATENTS

| | | | |
|---|---|---|---|
| 3,172,844 | 3/1965 | Kurz | 209—211 |
| 3,259,246 | 7/1966 | Stavenger | 209—211 X |
| 3,339,740 | 9/1967 | Starzyk | 210—512 X |
| 3,358,833 | 12/1967 | Cantrell | 209—211 |

JAMES L. DECESARE, Primary Examiner